(12) United States Patent
Julicher et al.

(10) Patent No.: US 6,295,900 B1
(45) Date of Patent: Oct. 2, 2001

(54) FASTENER CONSTRUCTIONS

(75) Inventors: Bradley J. Julicher, Orchard Park; Thomas R. Lanham, Boston, both of NY (US)

(73) Assignee: McGard, Inc., Orchard Park, NY (US)

( * ) Notice: Subject to any disclaimer, the term of this patent is extended or adjusted under 35 U.S.C. 154(b) by 0 days.

(21) Appl. No.: 09/413,550

(22) Filed: Oct. 6, 1999

(51) Int. Cl.$^7$ .................................................. B25B 13/48
(52) U.S. Cl. ................................................ 81/436; 411/910
(58) Field of Search ........................... 81/436, 439, 461; 411/402, 403, 410, 427, 429, 910, 911

(56) References Cited

U.S. PATENT DOCUMENTS

| | | | | |
|---|---|---|---|---|
| 2,248,695 | * | 7/1941 | Bradshaw | 411/402 |
| 2,777,353 | * | 1/1957 | Willis | 411/403 |
| 3,241,408 | * | 3/1966 | McCauley | 81/436 |
| 4,480,513 | * | 11/1984 | McCauley et al. | 81/436 |
| 4,648,293 | * | 3/1987 | McCauley | 81/436 |
| 4,723,866 | * | 2/1988 | McCauley | 411/910 |
| 4,726,723 | * | 2/1988 | Bainbridge | 411/910 |
| 5,237,893 | * | 8/1993 | Ryder et al. | 81/436 |
| 5,469,726 | * | 11/1995 | Rushing et al. | 411/910 |
| 5,598,753 | * | 2/1997 | Lee | 411/911 |

* cited by examiner

Primary Examiner—Eileen P. Morgan
Assistant Examiner—Joni B. Danganan
(74) Attorney, Agent, or Firm—Joseph P. Gastel

(57) ABSTRACT

A noncircular-based undulating key-receiving configuration, opposed undulating side walls in said configuration, a centerline within said side walls, with the centerline of the configuration lying within inner and outer noncircular perimeters. A key-receiving configuration containing a first undulating configuration within a second undulating configuration. A key having a first body insertable within a second body with both bodies having undulating key configurations thereon. A key-receiving groove having chamfered edges.

19 Claims, 4 Drawing Sheets

FASTENER CONSTRUCTIONS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to improved fastener constructions of the type having a curvilinear key-receiving groove therein.

By way of background, fasteners having curvilinear key-receiving grooves therein are well known. In the past, these grooves have been derived from a circular configuration. This limited the number of configurations which could be made, even though such different configurations were extremely numerous. In addition, in the past fasteners with grooved types of key-receiving configurations, insofar as known, contained only a single groove, which in certain circumstances limited the usefulness of the fasteners. In addition, in the past fasteners having groove-type of key-receiving configurations were based on a circular configuration and had sharp edges. These sharp edges rendered them susceptible to having counterfeit keys made from the grooves because the sharp edges facilitated the driving of a cylindrical member into the grooves. It is with addressing the foregoing aspects of the prior art that the present invention is concerned.

BRIEF SUMMARY OF THE INVENTION

The present invention relates to an improved fastener having a key-receiving groove configuration which is based on a noncircular configuration and wherein the noncircular configuration can be oriented along different sized and differently oriented axes so as to practically infinitely increase the number of key-receiving configurations which may be made.

Another object of the present invention is to provide an improved key-receiving configuration wherein dual grooves are formed in the fastener so that two different keys can be used to actuate the fastener, or both keys may simultaneously be needed to actuate the fastener.

A further object of the present invention is to provide an improved groove type of fastener wherein the groove has chamfered edges, which thereby greatly limits the ability of keys to be counterfeited therefrom. Other objects and attendant advantages of the present invention will readily be perceived hereafter.

The present invention relates to a noncircular-based undulating key-receiving configuration comprising opposed undulating side walls, a centerline within said side walls, and said centerline lying within inner and outer noncircular perimeters.

The present invention also relates to a key-receiving configuration comprising an undulating groove, and chamfered edges in said groove.

The present invention also relates to a key-receiving configuration comprising a first key-receiving undulating configuration, and a second key-receiving undulating configuration within said first undulating key-receiving configuration.

The present invention also relates to a key comprising a first body, a first undulating key configuration on said body, a second body, a second undulating key configuration on said second body, said first body being mountable on said second body for effecting simultaneous engagement between said first undulating key configuration with a first undulating key-receiving configuration and between said second undulating key configuration with a second undulating key-receiving configuration.

The various aspects of the present invention will be more readily understood when the following portions of the specification are read in conjunction with the accompanying drawings wherein:

DETAILED DESCRIPTION OF THE INVENTION

Figure 10:
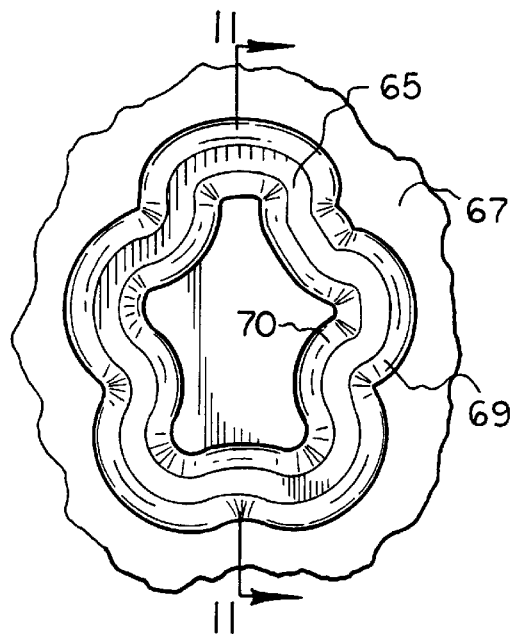
FIG. 10 is a representation of a fastener with a key-receiving groove having chamfered edges.
Figure 11:
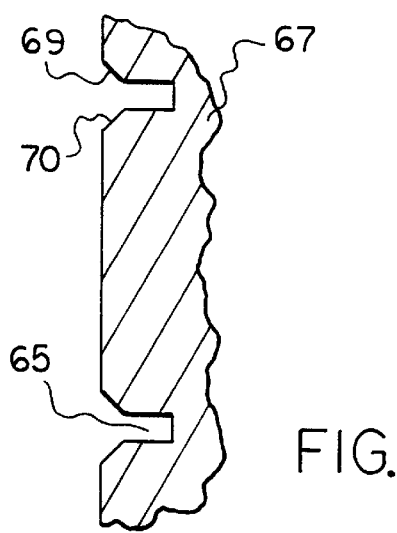
FIG. 11 is a fragmentary cross sectional view taken substantially along line 11—11 of FIG. 10.
Figure 12:
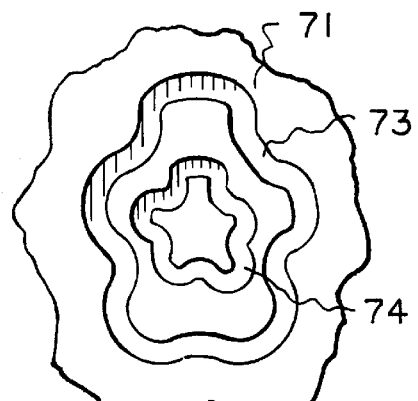
FIG. 12 is an end elevational view of a fastener having a first key-receiving groove within a second key-receiving groove wherein both grooves are derived from oval configurations.
Figure 13:
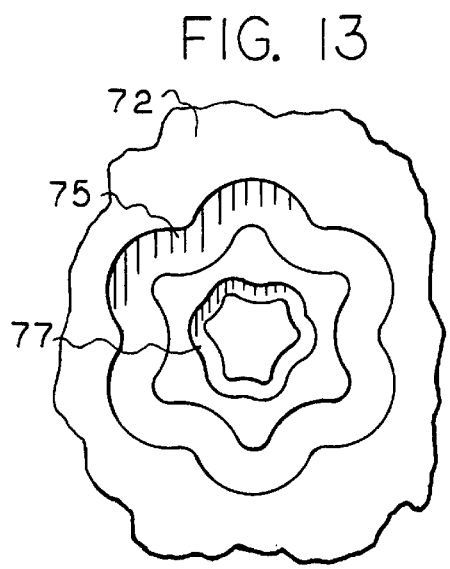
FIG. 13 is an end elevational view of first and second key-receiving grooves in a fastener wherein both grooves are derived from circular configurations.
Figure 14:
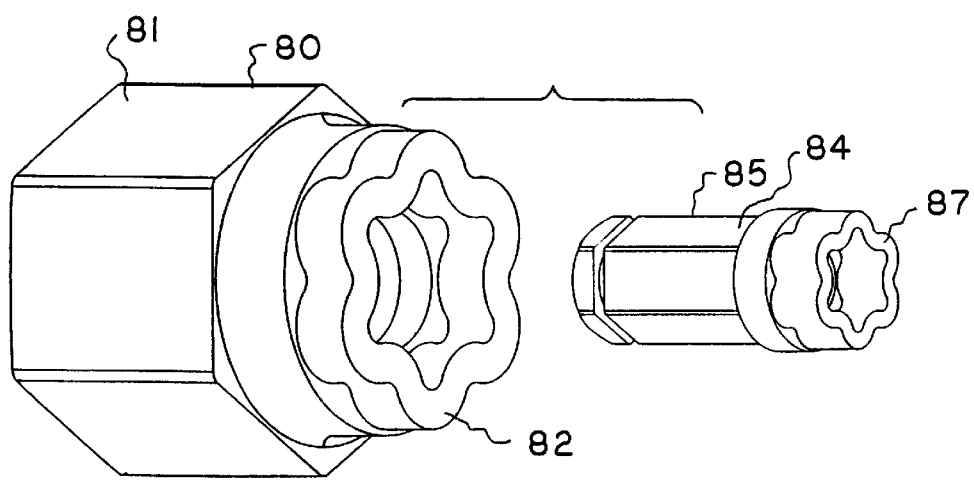
FIG. 14 is a perspective view of a compound key having two assemblable bodies for mating with two key-receiving grooves of a fastener.
Figure 15:
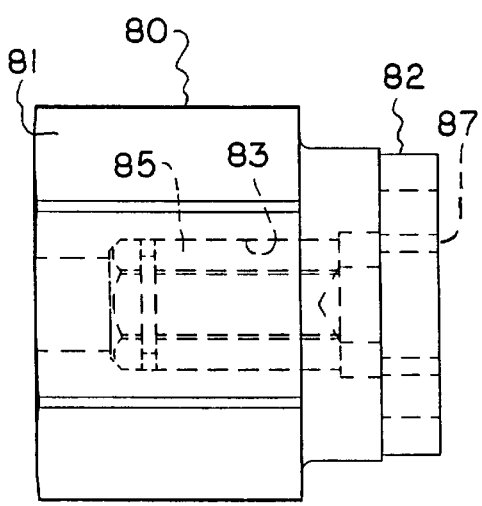
FIG. 15 is a side elevational view of the two keys of FIG. 14 in assembled relationship.

Summarizing briefly in advance, the present invention includes a number of aspects. One aspect, as depicted in FIGS. 4–7 relates to a key-receiving configuration in the form of a groove which is based on a noncircular reorientation of a prior key-receiving groove which was based on a circular configuration. Another aspect of the present invention, as represented in FIGS. 10 and 11 is a key-receiving groove having chamfered edges. Still another aspect of the present invention, as depicted in FIGS. 12 and 13 are dual key-receiving grooves in a single fastener. Still another aspect of the present invention, as depicted in FIGS. 14 and 15 is a key containing two separable assemblable keys for mating with a fastener having two key-receiving patterns.

Figure 1:
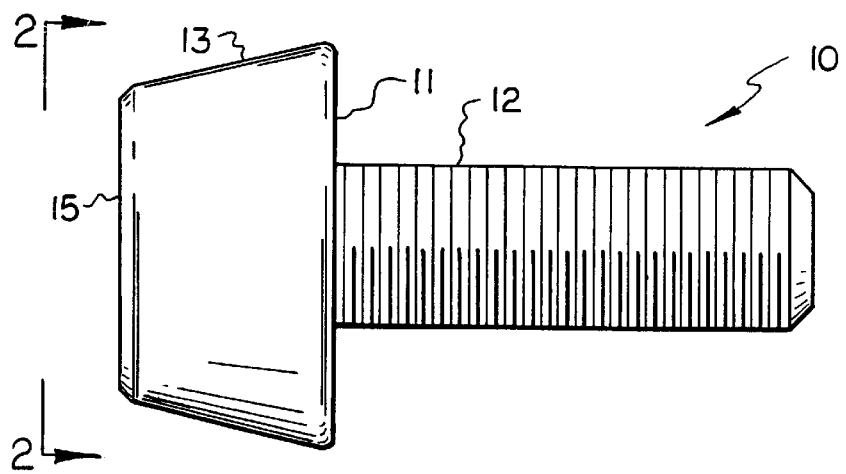
FIG. 1 is a side elevational view of a fastener in the form of a bolt having one embodiment of the improved key-receiving configuration on the head thereof.
Figure 2:
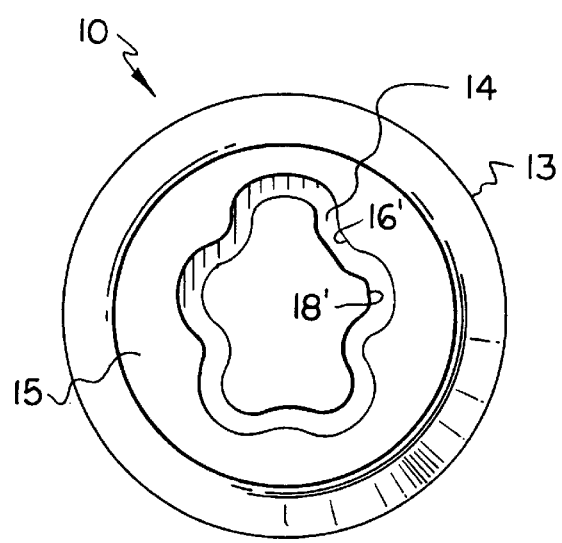
FIG. 2 is an end elevational view taken substantially in the direction of arrows 2—2 of FIG. 1.

In FIGS. 1 and 2 a fastener 10 is shown in the form of a bolt 11 having a threaded shank 12 and a frustoconical head 13 with a key-receiving groove 14 with walls 16' and 18' in face 15 thereof. Groove 14 is preferably derived from a noncircular configuration of the type discussed hereafter relative to FIGS. 4–7.

Figure 3:
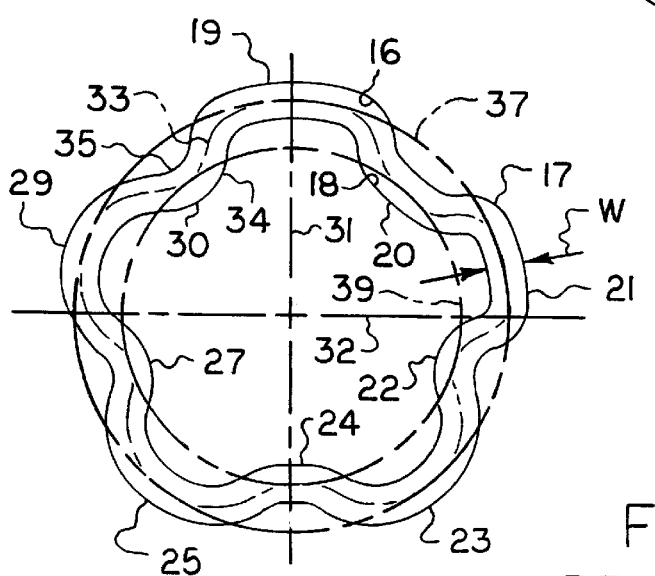
FIG. 3 is a diagrammatic representation of a prior art key-receiving groove derived from a circular configuration.
Figure 4:
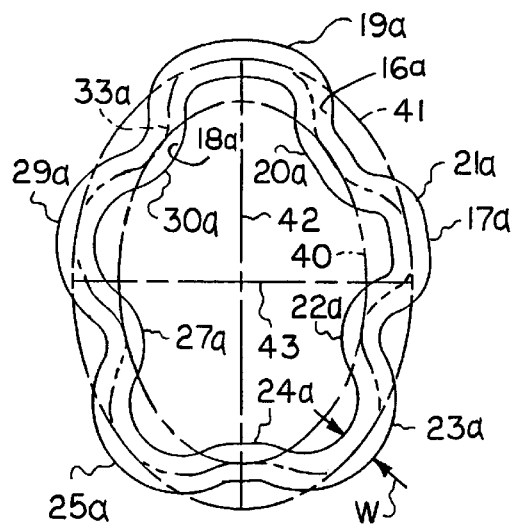
FIG. 4 is a schematic representation of a noncircular key-receiving groove wherein the circular configuration of FIG. 3 has been reoriented into an oval configuration with the major axis oriented in the same attitude as the vertical axis of FIG. 3 and the minor axis being oriented in the same attitude as the horizontal axis of FIG. 3.

A prior art key-receiving configuration in the form of a groove 17 is shown in FIG. 3 having side walls 16 and 18 which define lobes 19, 20, 21, 22, 23, 24, 25, 27, 29 and 30. Key-receiving groove 17, as depicted in FIG. 3, has a vertical axis 31 and a horizontal axis 32. It also has a width W, and the centerline 33 between the side walls 16 and 18 of groove 17 at all points is equidistant from its inner edge 34 and its outer edge 35. The groove 17 is generated from a circular configuration having an outer circle 37 and an inner circle 39. The centerline 33 of lobed groove 17 cannot extend outwardly beyond the perimeter of outer circle 37 and cannot extend inwardly beyond the perimeter of inner circle 39.

It will readily be appreciated that, based on a circular configuration, the shape of the lobes of a key-receiving groove 17 can only be varied beyond a certain amount, at which time the key-receiving configurations thereof reach a predetermined limit.

In accordance with the present invention, the circular basis of the prior art key-receiving groove 17 is reoriented into a noncircular configuration from which undulating key-receiving curves are obtained so as to extend the number of key-receiving groove configurations beyond that to which a circular key-receiving groove is limited. This is accomplished by adopting a noncircular key-receiving configuration which is derived from a circular based key-receiving configuration, such as shown in FIG. 3. In this respect, in FIG. 4 the key-receiving groove 17a is essentially a reorientation of the key-receiving groove of FIG.3, and it is based on inner and outer ovals 40 and 41 which lie on a major axis 42 and a minor axis 43. In other words, the inner and outer circles 39 and 37, respectively, have been formed into inner and outer ovals 40 and 41, respectively. Groove 17a has side walls 16a and 18a and a centerline 33a between the side walls and a width W. Side walls 16a and 18a define lobes 19a, 20a, 21a, 22a, 23a, 24a, 25a, 27a, 29a and 30a which correspond to the lobes in FIG. 3 having the same numeral without the suffix a. However, the respective lobes of FIGS. 3 and 4 having the same basic numeral are of slightly different shape in FIG. 4 than those of FIG. 3 because of the conversion of the circular configuration of FIG. 3 to the noncircular oval configuration of FIG. 4. Therefore, the key-receiving groove 17a provides a different configuration for receiving a key than that of FIG. 3. Her e again, the oval key-receiving configuration 17a has centerline 33a which does not extend outwardly beyond the perimeter of the outer oval 41 nor can it extend inwardly beyond the perimeter of inner oval 40.

Figure 5:
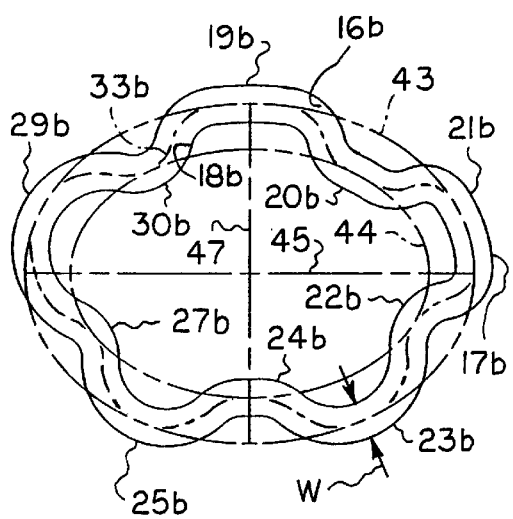
FIG. 5 is a schematic representation of a noncircular key-receiving groove wherein the circular configuration of FIG. 3 has been reoriented into an oval configuration with the major axis of the oval being in the same attitude as the horizontal axis of FIG. 3 and the minor axis being in the same attitude as the vertical axis of FIG. 3.

In FIG. 5 there is shown a key-receiving groove 17b which is derived from the groove 17 based on circles 37 and 39 but it is based on ovals 43 and 44 which have a major axis 45 and a minor axis 47. In other words, the inner and outer circles 39 and 37, respectively, have been reoriented into ovals 44 and 43, respectively. The key-receiving groove 17b has side walls 16b and 18b which define lobes 19b, 20b, 21b, 22b, 23b, 24b, 25b, 27b, 29b and 30b. Groove 17b also has a centerline 33b between the side walls and a width W. The groove 17b is based on the same geometry as the grooves of FIGS. 3 and 4, namely, that the centerline 33b does not extend outwardly beyond the perimeter of outer oval 43, nor does it extend inwardly beyond the perimeter of inner oval 44. It will be appreciated, however, that the lobes of groove 17b having lobes with the numerals having the suffix b are slightly different in shape than the lobes having like numerals with the suffix a of FIG. 4 and the lobes of FIG. 3 having like numerals without suffixes.

Figure 6:
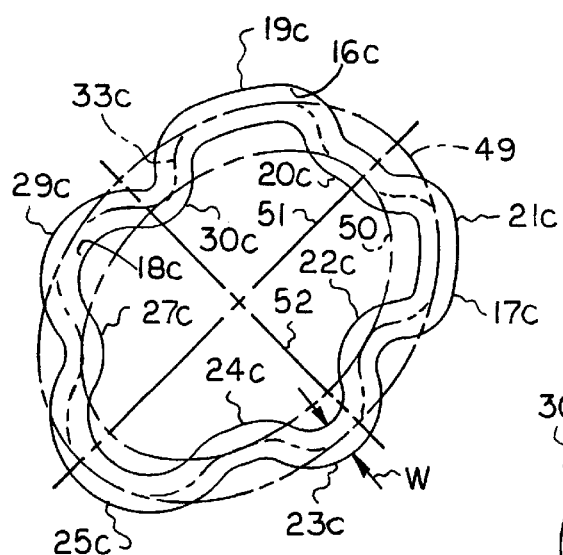
FIG. 6 is a schematic representation of a noncircular key-receiving groove wherein the circular configuration of FIG. 3 has been reoriented into an oval configuration with the major axis corresponding to the vertical axis of FIG. 3 being oriented at 45° relative to the vertical axis of FIG. 3 and the minor axis being oriented 45° clockwise from the horizontal axis of FIG. 3.

In FIG. 6 a key-receiving groove 17c is shown which is based on a noncircular oval configuration having an outer perimeter 49 and an inner perimeter 50 with the oval lying on a major axis 51 and a minor axis 52. The major axis is offset 45° clockwise from the vertical axis 31 of the circular based groove configuration of FIG. 3. Groove 17c has side walls 16c and 18c which define lobes 19c, 20c, 21c, 22c, 23c, 24c, 25c, 27c, 29c and 30c which correspond to the lobes of FIG. 4 having the same numeral but the suffix a and to the lobes of FIG. 5 having the same numerals but the suffix b and to the lobes of FIG. 3 having the same numerals without suffixes. Groove 17c has a centerline 33c between the side walls and a width W. The groove 17c has the same basic characteristic of the three prior grooves of FIGS. 3, 4 and 5, namely, its centerline 33c cannot extend beyond the perimeter of outer oval 49 nor can it extend inwardly beyond the perimeter of inner oval 50. Because of the shifting of the axes 51 and 52 of FIG. 6 to a different orientation than the axes of FIGS. 4 and 5, the lobes of groove 17c will be of a different shape than the lobes of the grooves 17, 17a and 17b of FIGS. 3, 4 and 5, respectively.

Figure 7:
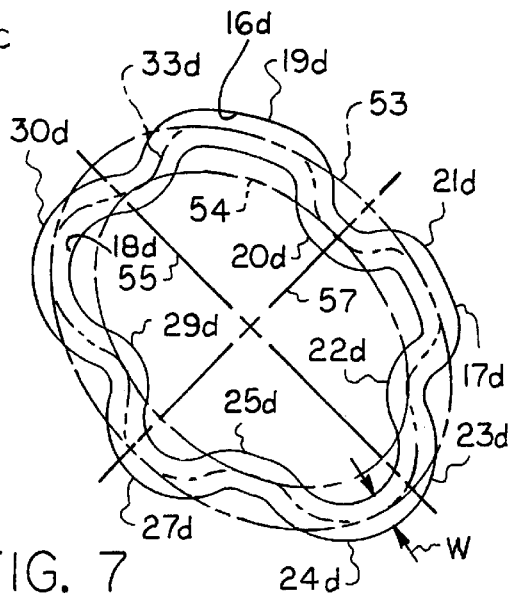
FIG. 7 is a schematic representation of a noncircular key-receiving groove wherein the circular configuration of FIG. 3 has been reoriented into an oval configuration with the major axis being oriented 45° counterclockwise from the vertical axis of FIG. 3 and the minor axis being oriented 45° counterclockwise from the horizontal axis of FIG. 3.

In FIG. 7 key-receiving groove 17d is shown which is based on an oval configuration having an outer oval 53 and an inner oval 54 having a major axis 55 and a minor axis 57. The major axis 55 has been shifted 45° counterclockwise from the vertical axis 31 of the circular based groove configuration of FIG. 3, and the minor axis 57 has been shifted 45o counter-clockwise from the horizontal axis 32 of FIG. 3. The resulting groove 17d has walls 16d and 18d which define lobes 19d, 20d, 21d, 22d, 23d, 24d, 25d, 27d, 29d and 30d. Groove 17d has a centerline 33d between the side walls and a width W. As in the configurations of FIGS. 4, 5 and 6, centerline 33d of undulating groove 17d cannot extend outwardly beyond the perimeter of outer oval 53, nor can it extend inwardly beyond the perimeter of inner oval 54. It will be appreciated that the lobes of groove 17d have different configurations than the lobes of FIGS. 4, 5 and 6 having the same numeral but different suffixes because of the manner in which the axes of the noncircular configurations have been oriented in a different attitude than the attitudes of the noncircular configurations of FIGS. 4, 5 and 6.

While the shifting of the major and minor axes of the ovals in FIGS. 4, 5, 6 and 7 have been initially 45° apart, it will be appreciated that if different degrees of shifting of the major and minor axes are effected, still different lobe configurations can be obtained. Thus, virtually infinite numbers of key-receiving groove configurations can be generated by not only orienting the axes of ovals in different attitudes, but different groove configurations can also be generated by changing the dimensions of the major and minor ovals.

Figure 8:
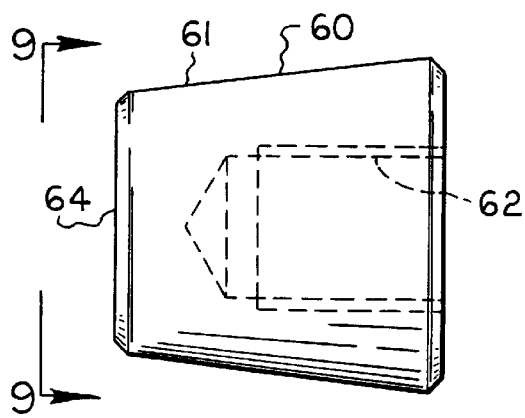
FIG. 8 is a side elevational view of a fastener in the form of a nut having an improved key-receiving configuration of the present invention thereon.
Figure 9:
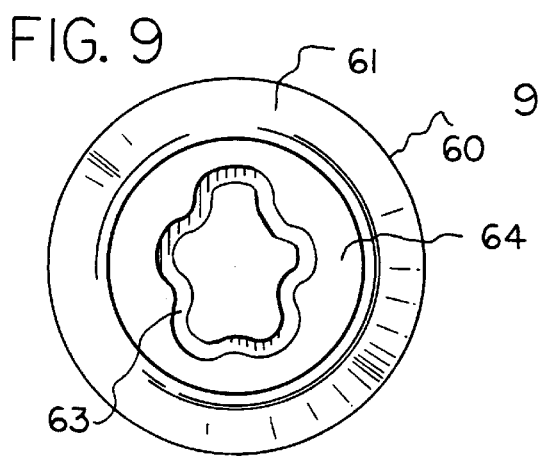
FIG. 9 is an end elevational view taken substantially in the direction of arrows 9—9 of FIG. 8.

In FIGS. 8 and 9 a fastener in the form of a nut 60 is shown having a frustoconical outer contour 61 and a threaded interior 62. A key-receiving groove 63 is formed in face 64. The key-receiving groove 63 is shown merely by way of example, and it can be of any form of key-receiving groove which has been discussed heretofore or hereafter. This is also the case with the fastener 10 of FIGS. 1 and 2.

In FIGS. 10 and 11 a modified form of key-receiving groove 65 is shown on a fastener 67, which may be a bolt or a nut, or any other type of fastener which can accommodate a key-receiving groove. The groove 65 has a chamfered outer edge 69 and a chamfered inner edge 70. Chamfering increases the difficulty with which someone may coin a key by driving a member into the groove because the material being driven into the groove tends to compress as it progresses inwardly into the groove, thereby limiting the amount that the foreign body can enter the groove. The chamfered groove may be used with key-receiving grooves of any type and shape including those disclosed in the present specification.

In FIGS. 12 and 13 a dual pattern groove is shown in the fasteners 71 and 72 which may be of any type including the bolt 10 of FIGS. 1 and 2 and a nut 60 of FIGS. 8 and 9. In FIG. 12 a dual key-receiving pattern is disclosed consisting of an outer oval based key-receiving groove 73 and an inner oval based key-receiving groove 74. In FIG. 13 the dual patterned key-receiving groove consists of a circular based outer key-receiving pattern 75 and an inner circular based key-receiving groove 77. It will be appreciated that the dual type of grooves such as shown in FIGS. 12 and 13 are merely by way of example, and it will be appreciated that each fastener may have a combination of a circular based groove and a noncircular based groove and that the combination may reside in either the circular or noncircular grooves being the outer grooves, whereas the inner one may be of the other type of a groove.

The dual type of key-receiving grooves may be used under different circumstances. One circumstance is where both patterns need be engaged by a dual patterned key to turn the fastener if the grooves are too narrow themselves to permit a key to turn the fastener. In other words, a single ridge on a mating key may possibly be too thin to withstand the torque required to turn a fastener, but two thin ridges may be able to withstand the necessary torque to turn the fastener. The other circumstance in which the dual types of grooves can be used is where either groove can receive a key for turning the fastener, and where one of the grooves is common to numerous fasteners having different configurations of the second groove. Thus, for example, a general party, such as the owner of meters in diverse areas, may have a key which can turn all of the fasteners whereas regional personnel may have keys which can only turn the fasteners in their particular area but cannot turn fasteners in a different area.

In FIGS. 14 and 15 a key arrangement is shown which may be utilized with a dual groove pattern, such as shown in FIGS. 12 and 13. More specifically, a key 80 includes an outer body 81 of hexagonal shape to receive a wrench. One end of body 81 has a curvilinear ridge 82 thereon for mating engagement with a correspondingly shaped groove. The body 81 includes a hexagonal bore 83 for receiving the hexagonal body 84 of key 85 in telescopic complementary mating relationship. Key 85 also has a curvilinear ridge 87 therein. When body 84 is installed in body 81, the curvilinear ridge 87 will lie within curvilinear ridge 82 so that both ridges 82 and 87 will be in position to enter a dual type of groove, such as shown in FIGS. 12 or 13. While not shown in FIGS. 14 and 15, an aligning key and keyway may be provided on bodies 84 and 81 so as to properly orient body 84 within body 81 when the ridges are not both of perfectly symmetrical configuration, such as shown in FIG. 14.

The key arrangement of FIGS. 14 and 15 can be used as described above, namely, both keys in an assembled relationship may be required to turn a fastener, and also the outer key may accept different inner keys.

While preferred embodiment of the present invention have been disclosed, it will be appreciated that the present invention is not limited thereto but may be otherwise embodied within the scope of the following claims.

What is claimed is:

1. A fastener including a noncircular-based undulating key-receiving configuration derived from a circular based undulating key-receiving configuration, said circular based undulating key-receiving configuration having a first centerline which lies between inner and outer circles, said noncircular-based undulating key-receiving configuration comprising opposed undulating side walls, and a second centerline within said opposed undulating side walls, said second centerline lying within inner and outer noncircular perimeters derived from said circular based undulating key-receiving configuration wherein said inner and outer noncircular perimeters are reorientations of said inner and outer circles.

2. A fastener as set forth in claim 1 wherein said noncircular key, receiving configuration is based on an oval.

3. A fastener as set forth in claim 1 wherein said undulating side walls define a groove.

4. A fastener including a key-receiving configuration as set forth in claim 1 wherein said undulating side walls define a groove, said groove including chamfered edges.

5. A key-receiving configuration comprising an undulating groove, and chamfered edges in said groove, said undulating groove being based on a noncircular configuration, and a second undulating key-receiving groove positioned relative to said undulating groove.

6. A key-receiving configuration as set forth in claim 5 wherein one of said grooves is derived from a circular based configuration.

7. A key-receiving configuration as set forth in claim 5 wherein both of said grooves are derived from noncircular based configurations.

8. A key-receiving configuration comprising a fastener, a first key-receiving undulating groove on said fastener, and a second key-receiving undulating groove on said fastener within said first undulating key-receiving groove.

9. A key-receiving configuration as set forth in claim 8 wherein at least on e of said first and second undulating grooves is based on a noncircular configuration.

10. A key-receiving configuration as set forth in claim 9 wherein at least one of said noncircular grooves is based on an oval.

11. A key-receiving configuration as set forth in claim 8 wherein both of said first and second undulating grooves are based on noncircular configurations.

12. A key-receiving configuration as set forth in claim 8 including a key for said key-receiving configuration, a first mating undulating key configuration for mating with said first key-receiving undulating groove, and a second undulating key configuration for mating with said second key-receiving undulating groove.

13. A key-receiving configuration and a key therefor as set forth in claim 12 wherein at least one of said key-receiving undulating grooves and said mating undulating key configuration is derived from a noncircular configuration.

14. A key-receiving configuration and a key therefor as set forth in claim 12 wherein both of said key-receiving undulating grooves and both of said undulating key configurations are derived from noncircular configurations.

15. A key-receiving configuration as set forth in claim 8 wherein said first and second grooves are based on circular configurations.

16. A key-receiving configuration comprising a fastener, a first key-receiving undulating configuration on said fastener, and a second key-receiving undulating configuration on said fastener within said first undulating key-receiving configuration, both of said first and second undulating configurations being derived from noncircular configurations which are based on ovals.

17. A key-receiving configuration comprising a fastener, a first key-receiving undulating configuration on said fastener, and a second key-receiving undulating configuration on said fastener within said first undulating key-receiving configuration, a key for said key-receiving configuration, a first mating undulating key configuration for mating with said first key-receiving undulating configuration, a second undulating key configuration for mating with said second key-receiving undulating configuration, both of said key-receiving undulating configurations and both of said undulating key configurations being derived from noncircular configurations, said first mating undulating key configuration being located on a first body, and said second undulating key configuration being located on a second body.

18. A key-receiving configuration and a key therefor as set forth in claim 17 wherein said first body is mountable on said second body for simultaneous engagement for effecting simultaneous engagement between said first undulating key configuration with said first undulating key-receiving configuration and between said second undulating key configuration with said second undulating key-receiving configuration.

19. A key comprising a first body, a first undulating key configuration on said body, a second body, a second undulating key configuration on said second body, said first body being mountable on said second body for effecting simultaneous engagement between said first undulating key configuration with a first undulating key-receiving configuration and between said second undulating key configuration with a second undulating key-receiving configuration.

\* \* \* \* \*

UNITED STATES PATENT AND TRADEMARK OFFICE
CERTIFICATE OF CORRECTION

PATENT NO. : 6,295,900 B1
DATED : October 2, 2001
INVENTOR(S) : Bradley J. Julicher et al.

It is certified that error appears in the above-identified patent and that said Letters Patent is hereby corrected as shown below:

<u>Column 4,</u>
Line 56, change "450" to -- 45° --.

<u>Column 6, claim 9,</u>
Line 60, change "on e" to -- one --.

<u>Column 6, claim 10,</u>
Line 63, after "wherein" insert -- said --.

Signed and Sealed this

Fifth Day of March, 2002

*Attest:*

*Attesting Officer*

JAMES E. ROGAN
*Director of the United States Patent and Trademark Office*